(12) United States Patent
Matsushita et al.

(10) Patent No.: US 12,019,843 B2
(45) Date of Patent: Jun. 25, 2024

(54) ICON DISPLAY CONTROLLING DEVICE AND ICON DISPLAY CONTROLLING PROGRAM

(71) Applicant: Faurecia Clarion Electronics Co., Ltd., Saitama (JP)

(72) Inventors: Yuki Matsushita, Saitama (JP); Azusa Shiina, Saitama (JP); Jun Sakura, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 17/976,708

(22) Filed: Oct. 28, 2022

(65) Prior Publication Data

US 2023/0137170 A1 May 4, 2023

(30) Foreign Application Priority Data

Oct. 29, 2021 (JP) ................. 2021-178169

(51) Int. Cl.
*G06F 3/048* (2013.01)
*G06F 3/04817* (2022.01)
(Continued)

(52) U.S. Cl.
CPC ........ *G06F 3/04817* (2013.01); *G06F 3/0486* (2013.01); *G06F 3/04842* (2013.01)

(58) Field of Classification Search
CPC . G06F 3/04842; G06F 3/0486; G06F 3/04817
See application file for complete search history.

(56) References Cited

U.S. PATENT DOCUMENTS

| 8,633,913 B1 * | 1/2014 | Raghu ................ G06F 3/01 345/173 |
| 2010/0070931 A1 * | 3/2010 | Nichols ............... G06F 3/0488 715/863 |

(Continued)

FOREIGN PATENT DOCUMENTS

| JP | 2009-522666 A | 6/2009 |
| WO | WO-2007/094894 A2 | 8/2007 |

(Continued)

OTHER PUBLICATIONS

Unpublished JP Application No. 2021-178168 filed Oct. 29, 2021, with English translation.

(Continued)

*Primary Examiner* — Rashawn N Tillery
(74) *Attorney, Agent, or Firm* — FOLEY & LARDNER LLP (57) ABSTRACT

An icon display controlling device includes: an area displaying unit that causes a display to display a display area within which a first icon can be placed; an operation receiving unit configured to receive a selecting operation for the first icon and a moving operation for moving, into the display area, the first icon that was selected by the selecting operation; and an image displaying unit that causes the display to display an image that shows the first icon at a predetermined placement position, determined in advance, within the display area, at a time within a first interval that extends from reception of the selecting operation by the operation receiving unit until immediately prior to movement of the first icon into the display area due to the moving operation.

7 Claims, 11 Drawing Sheets

(51) Int. Cl.
*G06F 3/0486* (2013.01)
*G06F 3/04842* (2022.01)

(56) References Cited

U.S. PATENT DOCUMENTS

| | | | | |
|---|---|---|---|---|
| 2012/0240071 A1* | 9/2012 | Park | ............... | G06F 3/0488 |
| | | | | 715/769 |
| 2016/0154572 A1* | 6/2016 | Ogawa | ............... | G06F 3/0486 |
| | | | | 715/763 |
| 2018/0335937 A1* | 11/2018 | Hauenstein | ......... | G06F 3/04883 |
| 2019/0394149 A1* | 12/2019 | McNeill | ............... | H04L 51/56 |
| 2021/0286510 A1* | 9/2021 | Tyler | ............... | G06F 3/0488 |
| 2022/0044395 A1* | 2/2022 | Ebrahimi | ............... | G06F 16/58 |
| 2022/0137791 A1* | 5/2022 | Lin | ............... | H04M 1/72469 |
| | | | | 715/761 |

FOREIGN PATENT DOCUMENTS

| WO | WO-2018212998 A1 * | 11/2018 | ............ | G06F 3/016 |
|---|---|---|---|---|
| WO | WO-2021183690 A1 * | 9/2021 | ............ | G06F 3/048 |

OTHER PUBLICATIONS

Unpublished JP Application No. 2021-193788 filed Nov. 30, 2021, with English translation.

* cited by examiner

ICON DISPLAY CONTROLLING DEVICE AND ICON DISPLAY CONTROLLING PROGRAM

CROSS-REFERENCE TO RELATED PATENT APPLICATION

This application claims the benefit of and priority to Japanese Patent Application No. 2021-178169, filed on Oct. 29, 2021, the entire disclosure of which is hereby incorporated by reference herein.

FIELD OF TECHNOLOGY

The present disclosure relates to an icon display controlling device and icon display controlling program.

BACKGROUND

There are known icon display controlling devices for controlling the display of icons. A specific structure for this type of icon display controlling device is disclosed in, for example, Japanese Patent Application Publication No. 2009-522666 ("Patent Document 1").

In the icon display controlling device according to Patent Document 1, the user can move, through a drag-and-drop operation, an icon that is displayed on the screen.

SUMMARY

With the icon display controlling device disclosed in Patent Document 1, when the user is moving the icon, it is difficult for the user to visualize the screen after the icon has been moved.

In consideration of the situation described above, an object of the present disclosure is to provide an icon display controlling device and icon display controlling program with which the user can visualize easily the screen after the icon has been moved.

An icon display controlling device according to one aspect of the present disclosure is structured comprising: an area displaying unit for displaying a display area at which a first icon can be placed; an operation receiving unit for receiving a selecting operation for the first icon and a moving operation for moving, into the display area, the first icon that was selected by the selecting operation; and an image displaying unit for displaying an image that shows the first icon at a predetermined placement position for the first icon, determined in advance, in the display area, upon elapsing of a first time that is included in a first interval from reception of the selecting operation by the operation receiving unit until immediately prior to movement of the first icon into the display area through the moving operation.

The icon display controlling device and icon display controlling program according to one embodiment of the present disclosure enables the user to visualize easily the screen after the icon has been moved.

DETAILED DESCRIPTION

An icon display controlling device and icon display controlling program according to one embodiment of the present disclosure will be explained below.

The icon display controlling device according to one embodiment of the present disclosure is a vehicle-mounted device for car audio, a navigation device, or the like. Note that the icon display controlling device is not limited to a vehicle-mounted device, but instead may be a device of another form, such as a smart phone, a feature phone, a tablet terminal, a Personal Computer (PC), a Personal Digital Assistant (PDA), a Portable Navigation Device (PND), a portable game machine, or the like.

Figure 1:
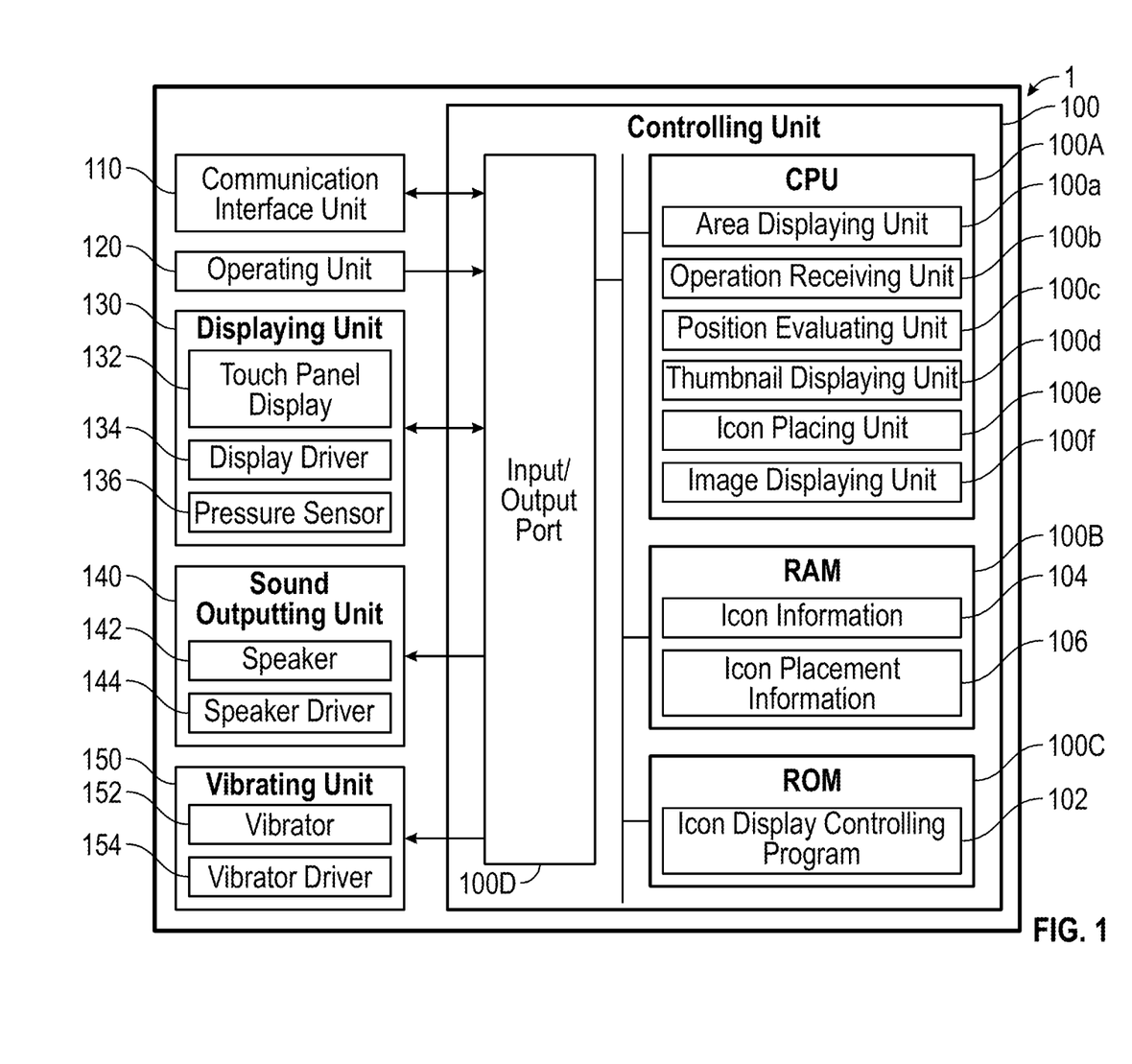
FIG. 1 is a block diagram showing the structure of an icon display controlling device according to one embodiment.

FIG. 1 is a block diagram showing the structure of an icon display controlling device 1 according to one embodiment of the present disclosure. As shown in FIG. 1, the icon display controlling device 1 comprises a controlling unit 100, a communication interface unit 110, an operating unit 120, a displaying unit 130 (e.g., a display), a sound outputting unit 140, and a vibrating unit 150. Note that the main structural elements required for explaining the present embodiment are illustrated in FIG. 1. However, part of structural elements are omitted from the figure arbitrarily.

The controlling unit 100 is that which controls the icon display controlling device 1 as a whole, and is a microcomputer structured from a Central Processing Unit (CPU) 100A, a Random Access Memory (RAM) 100B, a Read Only Memory (ROM) 100C, an input/output port 100D, and bus lines for connecting these ports, and the like.

The CPU 100A reads in a program that is stored in the ROM 100C, to control the icon display controlling device 1 in accordance with the program that has been read in. The CPU 100A comprises, as functional blocks, an area displaying unit 100a, an operation receiving unit 100b, a position determination unit 100c, a thumbnail displaying unit 100d, and icon placing unit 100e, and an image displaying unit 100f.

The CPU 100A, which is an example of a processor, may be, for example, a single processor or multiple processors, and includes at least one processor. When structured including a plurality of processors, the processor 10 may be packaged as a single device, or may be structured as a plurality of physically separated devices within a single icon display controlling device 1.

The RAM 100B is a storing unit for storing programs and data temporarily, providing a work area. The RAM 100B may be, for example, a Dynamic Random Access Memory (DRAM).

Icon information 104 and icon placement information 106 are stored in the RAM 100B.

The icon information 104 includes images, sizes, and shapes of icons, launch information for corresponding content (for example, music player applications, radio player applications, map applications, and the like), and so forth.

The ROM 100C is a non-volatile memory for storing various types of programs and data, including an icon display controlling program 102. The ROM 100C may be, for example, a flash memory. The music player application, radio player application, and map application, listed above by way of illustration, are stored in the ROM 100C.

The icon display controlling program 102 that is stored in the ROM 100C causes the CPU 100A, which is a computer, to execute: an area displaying step for displaying a display area wherein a first icon can be placed; an operation receiving step for receiving a selecting operation for the first icon and a moving operation for moving, into a display area, a first icon that has been selected by the selecting operation; and an image displaying step for displaying an image that shows the first icon at a predetermined placement position for the first icon, determined in advance, in the display area when a first time, which is included in a first interval from reception of the selecting operation by the operation receiving step up to immediately prior to the first icon being moved into the display area by the moving operation, elapsing. The execution of the icon display controlling program 102 enables the user to visualize easily the screen after the first icon has been moved. The details of the icon display controlling program 102 will be described below.

In the present embodiment, each functional block of the CPU 100A is achieved by the icon display controlling program 102, which is software. Note that each functional block of the CPU 100A may be achieved, in whole or in part, by hardware, such as a dedicated logic circuit, instead.

The input/output port 100D connects the controlling unit 100 to other structural elements (specifically, a communication interface unit 110, an operating unit 120, a displaying unit 130, a sound outputting unit 140, and a vibrating unit 150).

The communication interface unit 110 is an interface that handles the process of communicating with another terminal device. The icon display controlling device 1 is connected communicatively to another terminal device through a public circuit or a communication circuit that is a closed network such as a Virtual Private Network (VPN), through the communication interface unit 110.

The operating unit 120 is operating members for the user to operate the icon display controlling device 1, such as buttons, switches, or the like.

The displaying unit 130 has a touch panel display 132 and a display driver 134 for driving the touch panel display 132. The touch panel display 132 is structured so as to enable touch operations on the entire screen area. Note that "touch panel display" may refer simply to a "touch panel," or may refer to a "touch screen."

The touch panel display 132 is structured using, for example, a Liquid Crystal Display (LCD) or organic Electro Luminescence (EL). A resistance film system, electrostatic capacitance system, ultrasonic surface acoustic wave system, infrared radiation optical imaging system, electromagnetic induction system, or the like, may be used in the touch panel display 132. A pressure sensor 136 for detecting the pressure of a touch on the screen (in other words, a region wherein a touch operation can be performed) is built into the touch panel display 132.

The sound outputting unit 140 has a speaker 142 and a speaker driver 144 for driving the speaker 142. Music or voice that is stored in, for example, the ROM 100C or a storage medium that is not shown (a Hard Disk Drive (HDD), a Solid State Drive (SSD), a removable memory card, or the like) is outputted from the speaker 142 through driving of the speaker 142 by the speaker driver 144.

The vibrating unit 150 has a vibrator 152 and a vibrator driver 154 for driving the vibrator 152. The vibrator 152 may be structured using, for example, an Eccentric Rotating Mass (ERM), a Linear Resonant Actuator (LRA), a piezo element, or the like. The screen of the touch panel display 132 is vibrated by driving of the vibrator 152 by the vibrator driver 154.

Figure 2A:
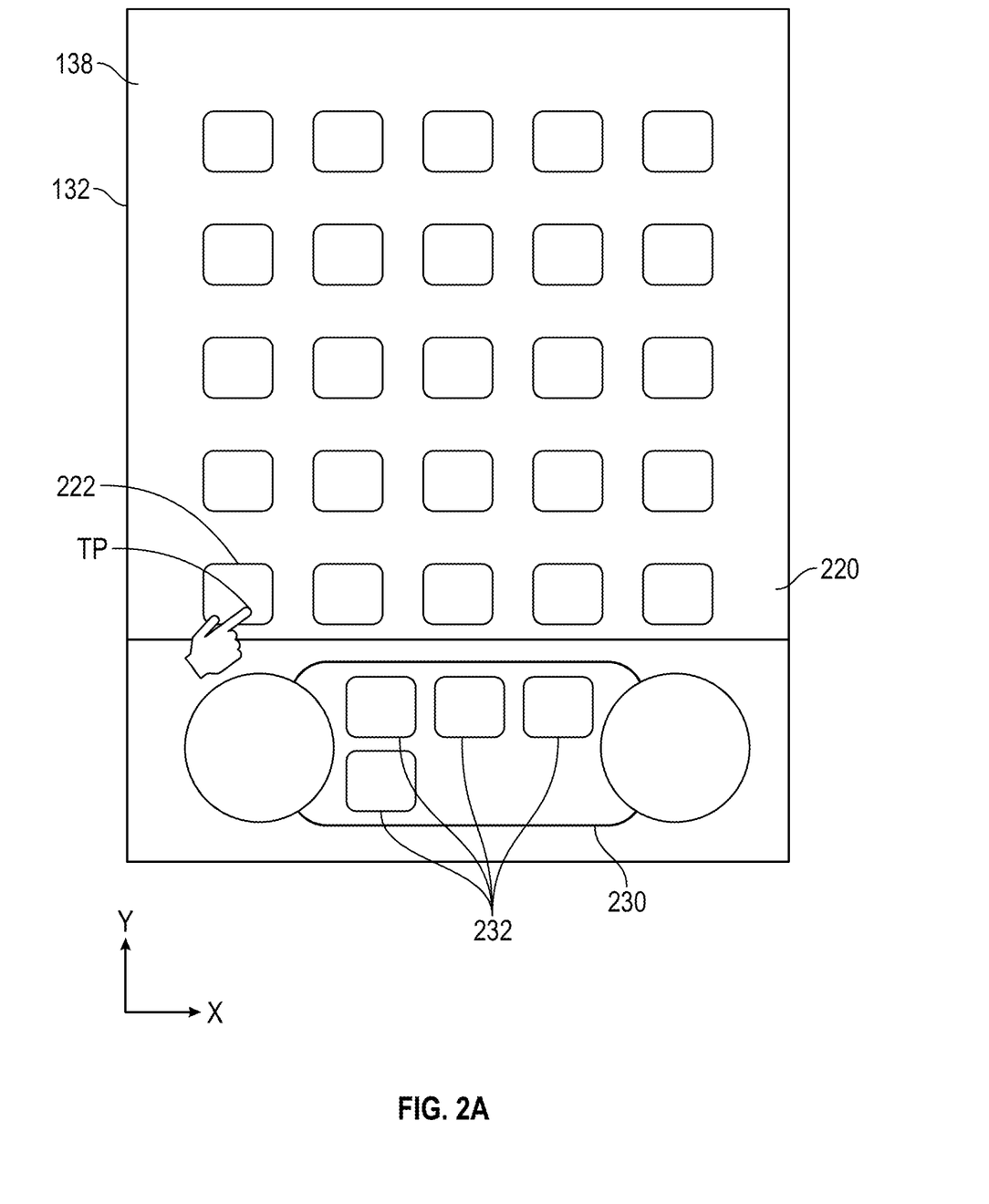
FIG. 2A is a diagram showing an example of an image that is displayed on the screen of a touch panel display in one embodiment.
Figure 2B:
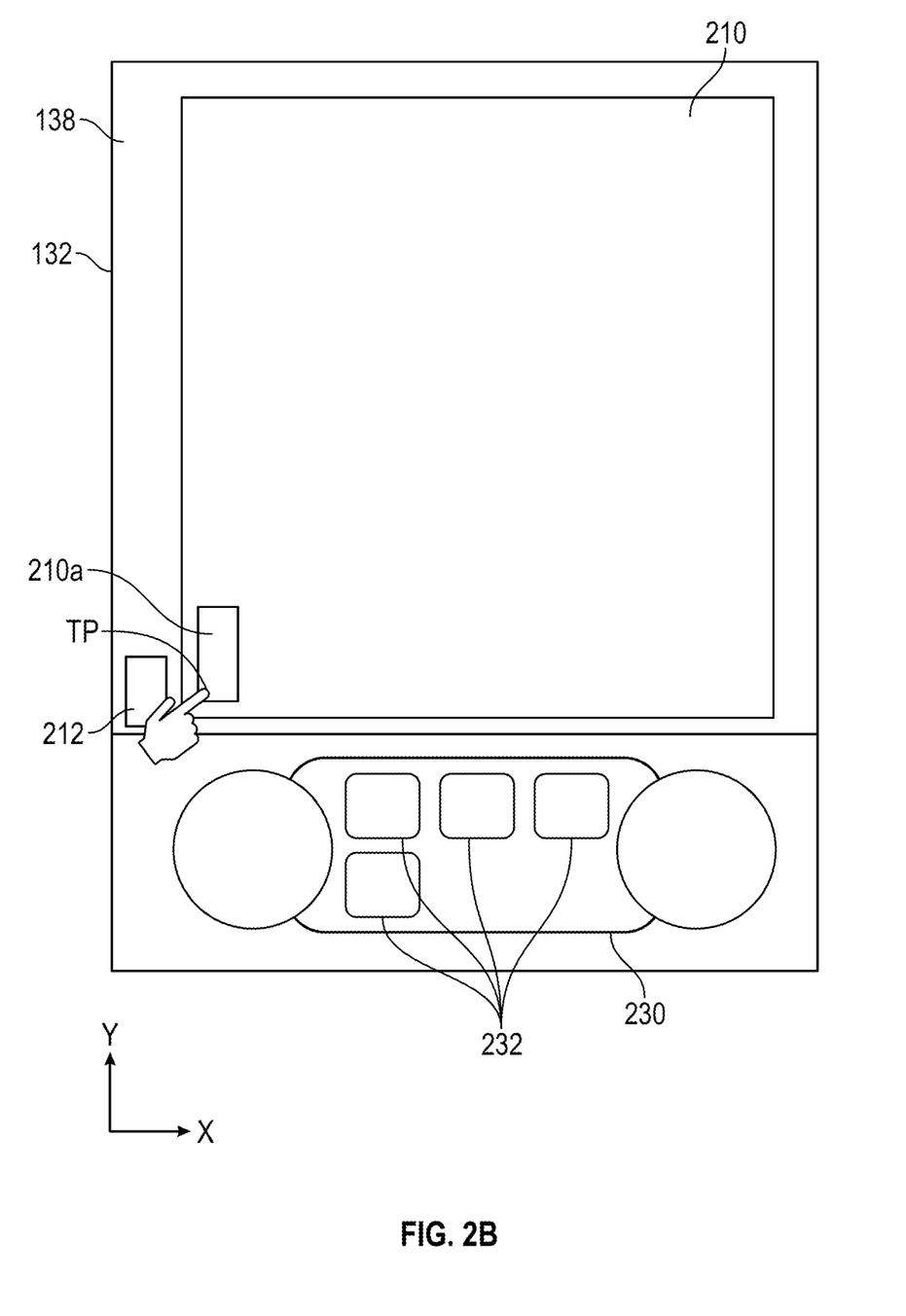
FIG. 2B is a diagram showing an example of an image that is displayed on the screen of a touch panel display in one embodiment.

FIG. 2A and FIG. 2B are diagrams showing examples of images that are displayed on the screen 138 of the touch panel display 132. Note that in FIG. 2A and FIG. 2B an icon of a hand that indicates the state where the user has touched the screen 138 is shown. The position of the fingertip of this icon is the user touch position TP on the screen 138. The user touch position TP on the screen 138 is acquired as X and Y two-dimensional coordinate information. The crosswise direction of the screen 138 corresponds to the X direction, and the vertical direction of the screen 138 corresponds to the Y direction.

As shown in FIG. 2A, a Graphical User Interface (GUI) screen that includes the icon display area 220 and a fixed icon display area at 230 is displayed on the screen 138.

Icons corresponding to various content are displayed in the icon display area 220 and the fixed icon display area 230. The user can cause the CPU 100A to execute the content that corresponds to an icon by touching that icon in the icon display area 220 or the fixed icon display area 230. For convenience, reference symbol 222 will be assigned to an icon that is placed in the icon display area 220, and reference symbol 232 will be assigned to an icon that is placed in the fixed icon display area 230.

When the user touches an icon 222 or 232, execution of the content corresponding to the touched icon is started, and also, as shown in FIG. 2B, a window 210 is displayed superimposed in front of the icon display area 220. An image for the content corresponding to the icon that was touched (for example, a music player application, a radio player application, a map application, or the like) is displayed in the window 210. By way of illustration, the jacket image, track name, artist name, playback position, and the like, for the music that is being played is displayed in the window 210 of a music player application. The broadcasting station, program name, broadcast frequency, and the like, is displayed in a radio player application.

A button 212 is displayed to the side of the window 210. When the button 212 is touched by a user, the window 210 is closed, and the screen 138 returns to the screen shown in FIG. 2A.

The user may instead return the screen 138 to the screen shown in FIG. 2A through performing a swiping operation on the window 210.

The icons 222 and 232 are of a display size that is smaller than the window 210. Because of this, the amount of information that can be displayed by the icons 222 and 232 is more limited than that of the window 210. For example, with the icon 222 or 232 for the music player application, only an icon image that indicates that it is the application is displayed.

The icon display controlling program 102 controls the display size and shape of each individual icon 222 and 232 within the icon display area 220 and the fixed icon display area 230 depending on the display size and shape information included in the icon information 104. The icon display controlling program 102 controls the placement of each icon 222 and 232 in the icon display area 220 and fixed icon display area 230 through icon placement information 106.

As shown in FIG. 2B, when the window 210 is displayed, icons 222 that are placed in the icon display area 220 will no longer be visible. That is, the icons 222 cannot always be seen.

In contrast, an icon 232 that is displayed in the fixed icon display area 230 can always be seen. Because of this, typically the user places, in the fixed icon display area 230, icons 232 that correspond to content that is used frequently.

By way of illustration, a maximum of six icons 232 can be placed in the fixed icon display area 230. Note that the number of icons 232 that can be placed in the fixed icon display area 230 is not limited thereto. In another embodiment, the number of icons 232 that can be placed in the fixed icon display area 230 may instead be 5 or less, or may instead be 7 or more.

Figure 3:
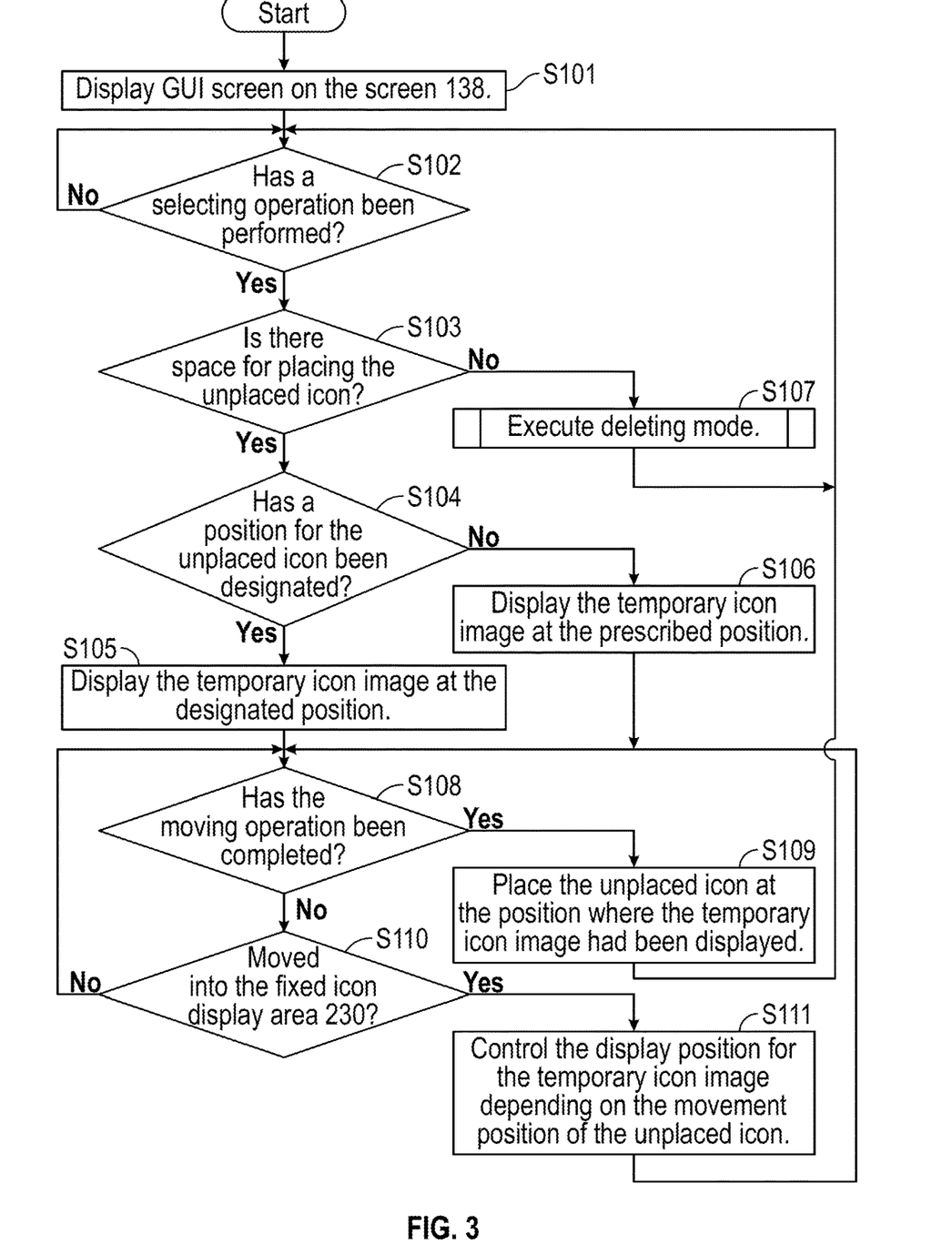
FIG. 3 is a flowchart showing the process of the icon display controlling program that is executed by a CPU in one embodiment.

FIG. 3 is a flowchart showing the processes of the icon display controlling program 102 that is executed by the CPU 100A in one embodiment of the present disclosure. Execution of the processes in the flowcharts shown in FIG. 3 commences upon startup of the system of the icon display controlling device 1, for example. The processes in the flowchart shown in FIG. 3 are terminated when the system of the icon display controlling device 1 is shut down.

When the system of the icon display controlling device 1 is started, the icon display controlling program 102 displays a GUI screen, of which an example is given in FIG. 2A, on the screen 138 (Step S101).

In this way, in Step S101 the icon display controlling program 102 operates as an area displaying unit 100a for displaying a fixed icon display area 230 wherein an icon can be placed (a first display area wherein an icon can be placed).

The icon display controlling program 102 determinates whether or not a selecting operation for selecting a first icon (that is, an icon that does not currently exist in the fixed icon display area 230, hereinafter termed an "unplaced icon") has been performed (Step S102).

For example, when the pressure sensor 136 that an unplaced icon that is one of the icons 222 placed in the icon display area 220 has been touched with a pressure of no less than a predetermined threshold value, the icon display controlling program 102 receives this touch operation as a selecting operation for the unplaced icon. When the icon display controlling program 102 receives a selecting operation for an unplaced icon, the mode is switched to an icon moving mode wherein a drag-and-drop operation on the unplaced icon is possible.

When in the icon moving mode, the icon display controlling program 102 receives a drag operation on the unplaced icon as a moving operation for the unplaced icon. The user is able to move the unplaced icon into the fixed icon display area 230 through, for example, the drag operation.

In this way, the icon display controlling program 102 operates as an operation receiving unit 100b for receiving a selecting operation for the unplaced icon (the first icon) and a moving operation for moving, into the fixed icon this display area 230 (the display area), the unplaced icon that was selected by the selecting operation.

The icon display controlling program 102 may cause a sound that indicates switching to the icon moving mode to be outputted from the speaker 142. Additionally, the icon display controlling program 102 may drive the vibrator 152 to vibrate the screen 138 in a predetermined pattern to notify the user that the mode has been switched to the icon moving mode.

Moreover, when switching to the icon moving mode, the icon display controlling program 102 may display on the screen 138, or cause outputting from the speaker 142 as voice guidance, a message stating, for example, "Please move the icon."

When a selecting operation for an unplaced icon has been performed (Step S102: YES), the icon display controlling program 102 determines whether or not there is space wherein the selected unplaced icon can be placed (that is, a position at which the selected unplaced icon can be placed) in the fixed icon display area 230 (Step S103).

In this way, in Step S103 the icon display controlling program 102 operates as a position determination unit 100c for determination whether or not there is a position in the fixed icon display area 230 (the display area) at which the unplaced icon (the first icon) can be placed.

If the fixed icon display area 230 has space for placement of the unplaced icon (Step S103: YES), the icon display controlling program 102 determines whether or not a position for the unplaced icon in the fixed icon display area 230 has been designated (Step S104).

If the position for the unplaced icon in the fixed icon display area 230 has been designated (Step S104: YES), the icon display controlling program 102 displays a temporary icon image at the designated position (Step S105).

The temporary icon image that is displayed in the fixed icon display area 230 is an image that shows the unplaced icon, for example, an image that resembles the unplaced icon.

The "designated position," referenced above, is a position, designated in advance by the user, for example, within the fixed icon display area 230.

If the position for the unplaced icon in the fixed icon display area 230 has not been designated (Step S104: NO), the icon display controlling program 102 displays the temporary icon image at a predetermined position within the fixed icon display area 230 (Step S106).

The "predetermined position" referenced above may be, for example, the position of the vacant space that is nearest to the first position. Taking FIG. 2A as an example, position in the top row, furthest to the negative side in the X-direction in the fixed icon display area 230 would be the first position. The further a position in the top row of the fixed icon display area 230 is toward the positive side in the X-direction from the first position, the further the position is from the first position. Moreover, a position in the bottom row of the fixed icon display area 230 that is furthest toward the negative side in the X-direction (the bottom row first position) is a position that is further from the first position than any position on the top row. For a position in the bottom row of the fixed icon display area 230, the further that position is toward the positive side in the X-direction from the bottom row first position, the further the position is from the bottom row first position, and also from the first position.

Information for the display size and shape of the unplaced icon (that is, the icon 222 that was selected by the selecting operation) is included in the icon information 104 that is stored in the RAM 100B, which is an information storing unit. In Step S105 and S106, the icon display controlling program 102 displays a temporary icon image of the same display size and shape as the display size and shape of the unplaced icon, which is stored in the RAM 100B.

Figure 4:
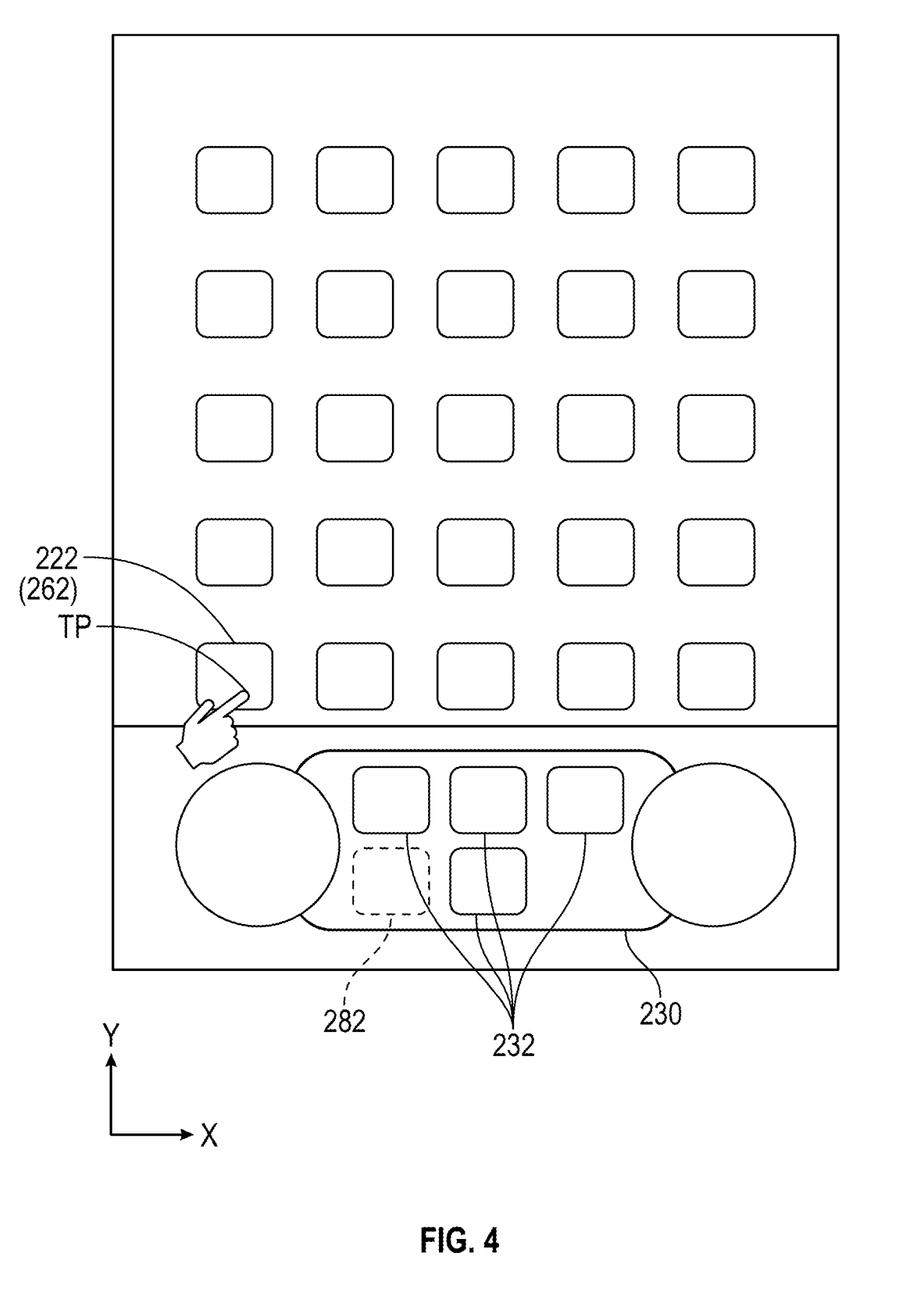
FIG. 4 is a diagram showing an example of processes in Step S105 of FIG. 3.
Figure 5:
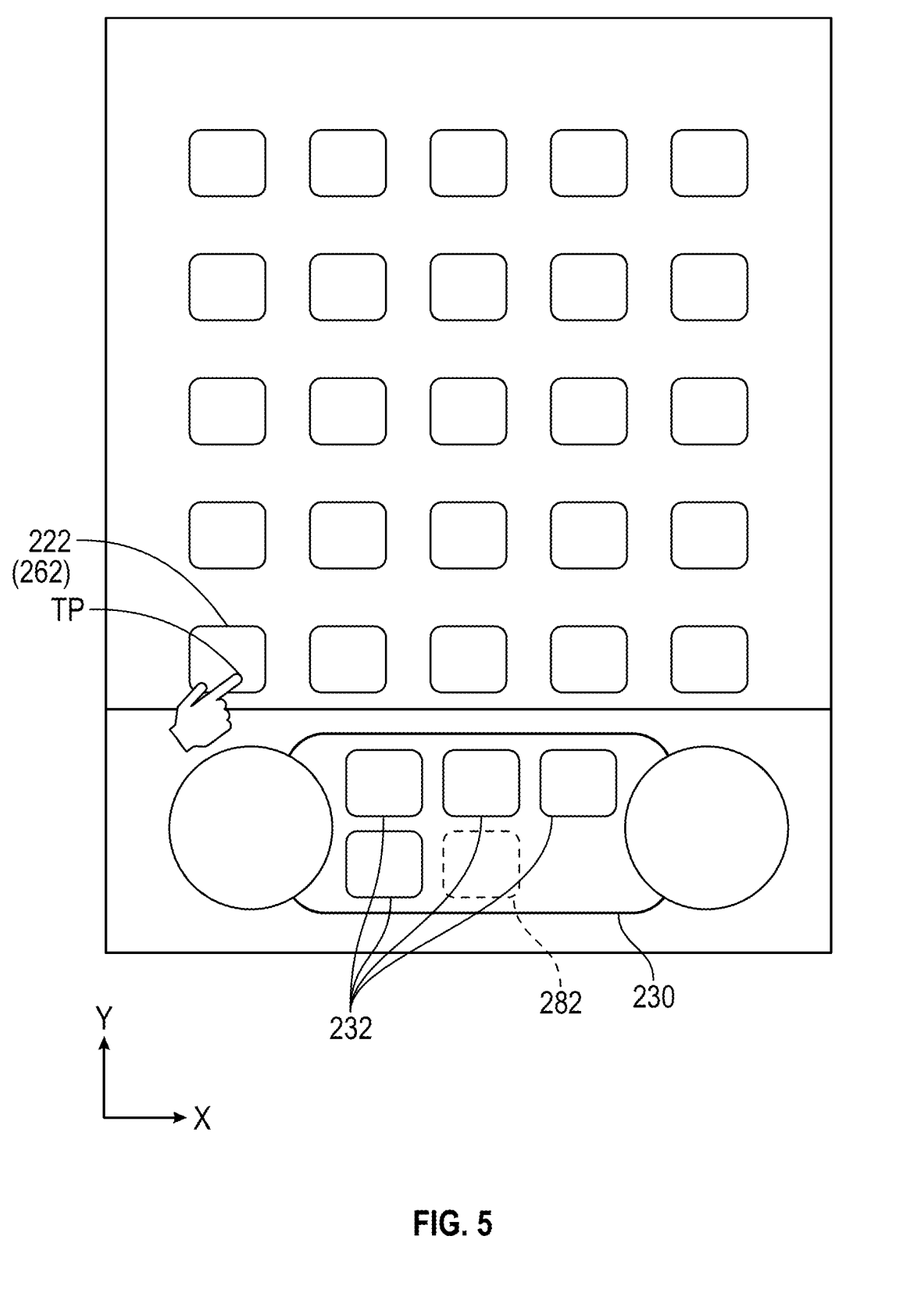
FIG. 5 is a diagram showing an example of processes in Step S106 of FIG. 3.

FIG. 4 and FIG. 5 are, respectively, diagrams showing an examples of the processes of Step S105 and S106.

Additionally, in the example in FIG. 4, it is assumed that the first position in the bottom row has been designated in advance as the position for the unplaced icon. The unplaced icon will be assigned reference symbol 262, below. Additionally, the temporary icon image will be assigned reference symbol 282.

In the example in FIG. 4, the icon display controlling program 102, in Step S105, displays the temporary icon image 282 on the screen in FIG. 2A at the bottom row first position, which is the designated position, and also moves the icon 232 that had been displayed at the bottom row first position to the bottom row center position, which is adjacent to the bottom row first position on the side in the positive X direction.

In the example in FIG. 5, in Step S105 the icon display controlling program 102 displays the temporary icon image 282 in the bottom row center position that is the position of the vacant space that is nearest to the first position in the screen of FIG. 2A.

In Step S105 and S106, the temporary icon image 282 is displayed with the same display size and shape as that of the icon 222 that was selected by the selecting operation.

The bottom row first position that is the designated position and the bottom row center position that is the predetermined position are predetermined placement positions for the unplaced icon 262 that were determined in advance in the fixed icon display area 230. The user is able to view the fixed icon display area 230 wherein the temporary icon image 282 is displayed, to visualize easily what the screen will be after the unplaced icon 262 has been moved into the fixed icon display area 230 (that is, after the unplaced icon 262 has been placed in the fixed icon display area 230).

If there is no space for placement of the unplaced icon 262 in the fixed icon display area 230 (Step S103: NO), the icon display controlling program 102 switches to a deleting mode that enables deletion of an icon 232, and executes the deleting mode (Step S107).

Figure 6:
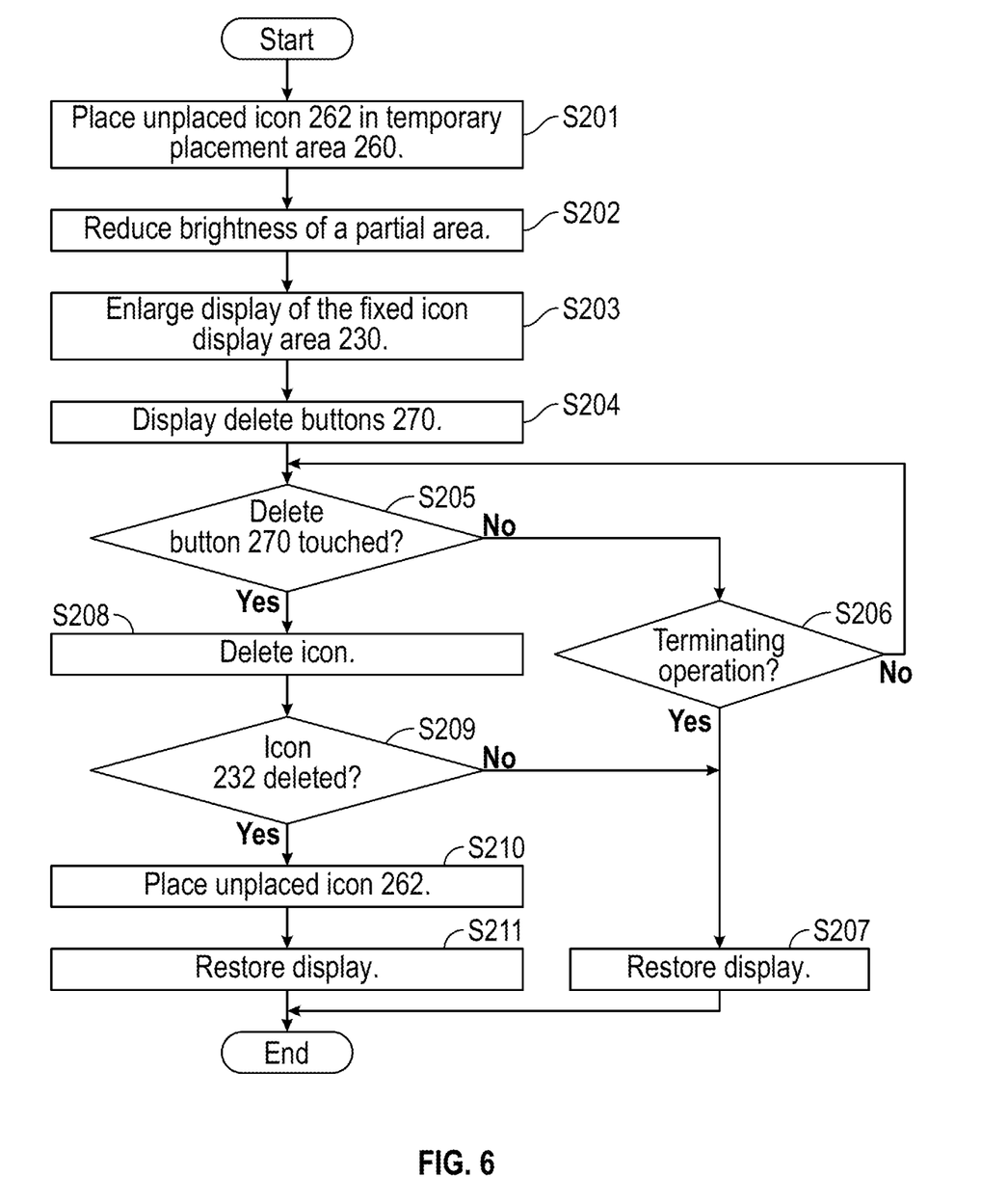
FIG. 6 is a diagram showing the subroutine of Step S107 in FIG. 3.
Figure 7:
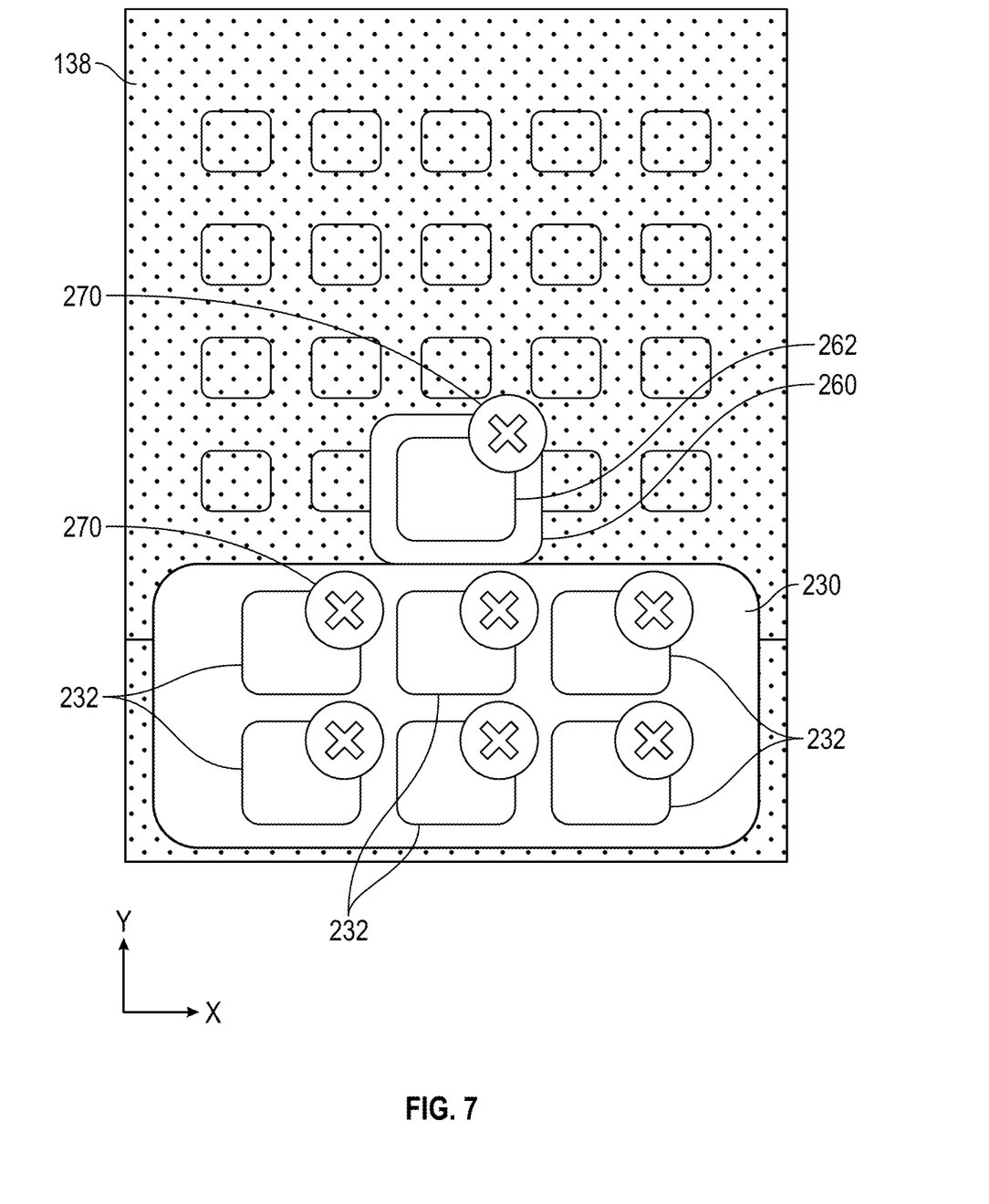
FIG. 7 is a diagram showing an example of an image that is displayed on the screen of a touch display panel in one embodiment.

FIG. 6 is a diagram showing a subroutine in Step S107 of FIG. 3. FIG. 7 is a diagram showing an example of an image that is displayed on the screen 138 when in deleting mode.

As shown in FIG. 6, the icon display controlling program 102 displays a temporary placement area 260 at a position that is adjacent to the fixed icon display area 230, and places, into the displayed temporary placement area 260, the unplaced icon 262 that is to be placed (Step S201).

In the present embodiment, in the deleting mode not just icons 232, but the unplaced icon 262 is also set as subject to deletion. The temporary placement area 260 is displayed in a position adjacent to the fixed icon display area 230, and the unplaced icon 262 is placed in the temporary placement area 260, to enable all of the icons that are subject to deletion to be visible to the user.

The icon display controlling program 102 displays, at a brightness that is lower than that of the fixed icon display area 230 and the temporary placement area 260, the area in the screen 138 that is other than that of the fixed icon display area 230 and the temporary placement area 260 (Step S202).

By way of illustration, the icon display controlling program 102 displays the fixed icon display area 230 at the same brightness, without changing, from before switching to the deleting mode, and displays the temporary placement area 260 with the same brightness as that of the fixed icon display area 230, but reduces the brightness of the areas other than those of the fixed icon display area 230 and the temporary placement area 260 when compared with the brightness thereof prior to switching to the deleting mode. Through this, the brightness of the areas other than those of the fixed icon display area 230 and the temporary placement area 260 will be less than that of the fixed icon display area 230 and the temporary placement area 260.

Because, in the screen 138, the fixed icon display area 230 and the temporary placement area 260 are displayed brightly, the user can identify easily the icons 232 in the fixed icon display area 230 and the unplaced icon 262 in the temporary placement area 260.

The icon display controlling program 102 displays the fixed icon display area 230 enlarged when compared to prior to switching to the deleting mode (Step S203).

Enlarging the display of the fixed icon display area 230 will cause the display size of the icons 232 to be larger, and the spacing between the icons 232 to be wider. This reduces the likelihood of an erroneous operation of touching an icon 232 that is not the icon 232 that the user wishes to delete the deleting mode.

The icon display controlling program 102 displays delete buttons 270 superimposed on the icons 232 within the fixed icon display area 230 and on the unplaced icon 262 in the temporary placement area 260 (Step S204). An image such as illustrated in FIG. 7 will be displayed on the screen 138 thereby. Delete buttons 270 that are displayed superimposed on each of the icons 232 and the unplaced icon 262 correspond to those icons. By touching a delete button 270 the user is able to delete the icon 232 or unplaced icon 262 that corresponds to the delete button 270 that is touched.

A determination is performed as to whether or not the user has touched a delete button 270 (Step S205).

If no delete button 270 has been touched (Step S205: NO), the icon display controlling program 102 determines whether or not an operation to terminate the deleting mode has been performed (Step S206). This terminating operation may be an operation that is a long push on a low-brightness area other than the fixed icon display area 230 and the temporary placement area 260, or a heavy touch operation on a low-brightness area.

When the operation for terminating the deleting mode has been performed (Step S206: YES), the icon display controlling program 102 returns the screen 138 to the display from immediately prior to switching to the deleting mode (Step S207), terminating the deleting mode. The icon display controlling program 102 returns to the process of Step S102, and awaits a selecting operation. In this case, the deleting mode is terminated without having deleted any icon 232. This can be stated differently as the deleting mode being terminated after having deleted the unplaced icon 262 of the temporary placement area 260.

When a delete button 270 is touched (Step S205: YES), the icon display controlling program 102 deletes the icon 232 or the unplaced icon 262 that corresponds to the delete button 270 that has been touched (Step S208).

When an icon 232 has been deleted (Step S209: YES), the icon display controlling program 102 places the unplaced icon 262 into the space within the fixed icon display area 230 that has been vacated by the deletion of the icon 232 (Step S210). The icon display controlling program 102 returns the screen 138 to the display from immediately prior switching to the deleting mode (albeit a display after the unplaced icon 262 has been placed into the fixed icon display area 230)

(Step S211), and terminates the deleting mode. The icon display controlling program 102 returns to the process of Step S102, and awaits a selecting operation.

If the unplaced icon 262 has been deleted (Step S209: NO), the icon display controlling program 102 returns the screen 138 to the display from immediately prior to switching into the deleting mode (Step S207), terminating the deleting mode, and returns to the process of Step S102, to await a selecting operation.

When the temporary icon image 282 is displayed in Step S105 or S106, the icon display controlling program 102 determines whether or not the moving operation for moving the unplaced icon 262 that was selected by the selecting operation has been completed (Step S108).

The icon display controlling program 102 may, for example, detect a drop operation with respect to the unplaced icon 262 on which a drag operation had been performed (that is, may detect the position wherein the user has removed the finger from the screen 138) as the completion of the moving operation.

When the moving operation is completed (Step S108: YES), the icon display controlling program 102 removes the display of the temporary icon image 282 and also places the unplaced icon 262 at the position at which the temporary icon image 282 had been displayed (Step S109). The icon display controlling program 102 terminates the icon moving mode and returns to Step S102, to await a selecting operation.

In this way, in Step S109 the icon display controlling program 102 operates as an icon placing unit 100e that places the unplaced icon 262 at the predetermined placement position for the unplaced icon 262 (that is, at the position at which the temporary icon image 282 was displayed), upon detection, by the operation receiving unit 100b, that the moving operation for the unplaced icon 262 (the first icon) has been completed.

In the example in FIG. 4, the unplaced icon 262 is placed at the bottom row first position in the fixed icon display area 230. In the example in FIG. 5, the unplaced icon 262 is placed at the bottom row center position in the fixed icon display area 230.

In this way, the user is able to use a simple operation to place the unplaced icon 262 in the fixed icon display area 230 after visualizing, in advance, the screen after the placement of the unplaced icon 262.

If the moving operation is continuing (Step S108: NO), the icon display controlling program 102 determines whether or not the unplaced icon 262 has moved into the fixed icon display area 230 (Step S110). For example, when the unplaced icon 262 has been dragged into the fixed icon display area 230, the unplaced icon 262 is determined as having been moved into the fixed icon display area 230.

When the unplaced icon 262 has been moved into the fixed icon display area 230 (Step S110: YES), the icon display controlling unit 102 controls the display position of the temporary icon image 282 depending on the position to which the unplaced icon 262 was moved (Step S111).

Figure 8:
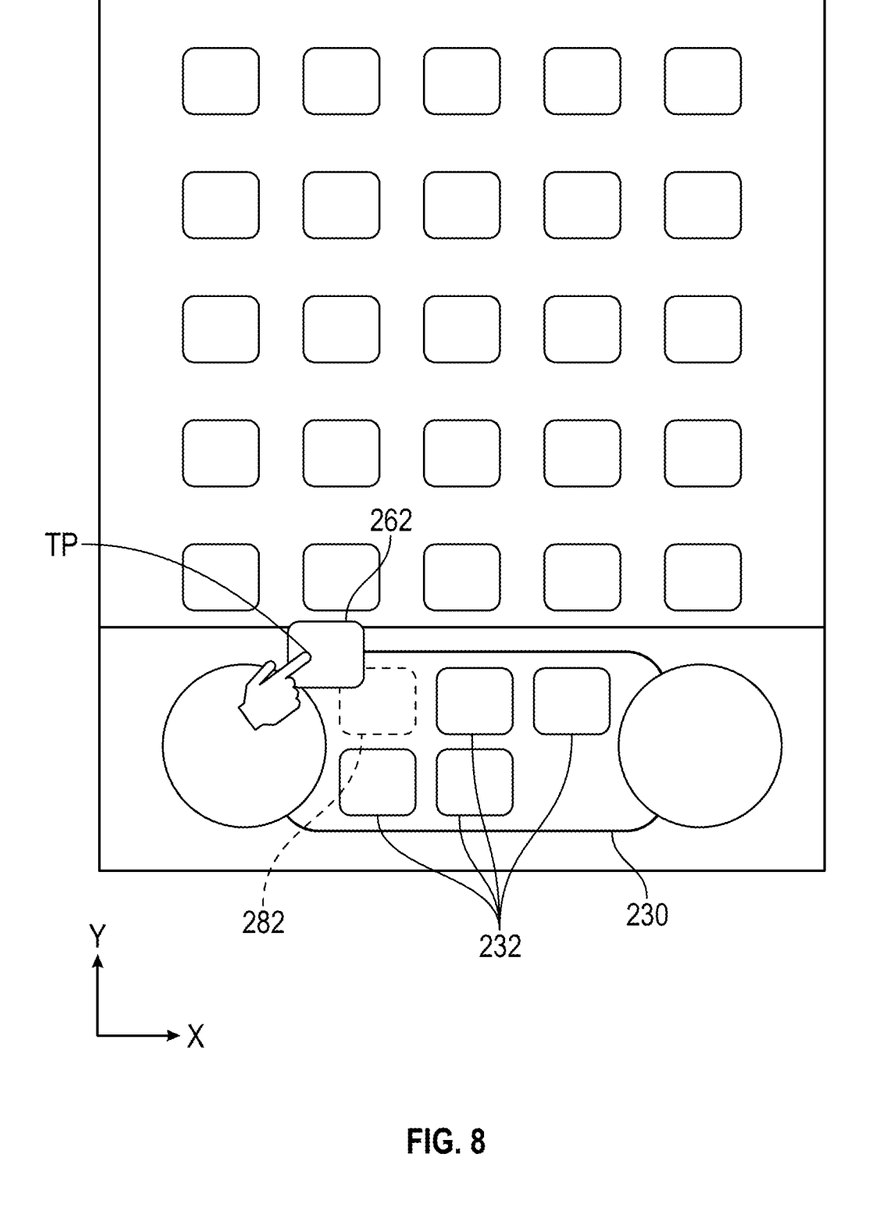
FIG. 8 is a diagram showing an example of processes in Step S111 of FIG. 3.

FIG. 8 is a diagram showing an example of processes in Step S111. For example, if, in FIG. 4, the unplaced icon 262 is dragged to the first position within the fixed icon display area 230, then, as shown in FIG. 8, the temporary icon image 282 that has been displayed at the bottom row first position will be moved to the first position, and the three icons 232 that had been displayed at each of the positions in the top row will be shifted away from the first position.

If the unplaced icon 262 is further dragged to be moved to, for example, the bottom row first position, the temporary icon image 282 that was displayed at the first position will be moved to the bottom row first position, and the three icons 232 that are nearer to the first position than the temporary icon image 282 will be shifted to positions that are nearer to the first position. That is, the arrangement of the icons 232 and the temporary icon image 282 within the fixed icon display area 230 will be returned to the arrangement shown in FIG. 4.

After the process in Step S111, if a drop operation is performed (Step S108: YES), the icon display controlling program 102 removes the display of the temporary icon image 282 and places the unplaced icon 262 at the position at which the temporary icon image 282 was displayed at the moment of the drop operation (Step S109).

In this way, the user is able to use a simple operation to place the unplaced icon 262 in the fixed icon display area 230 after visualizing, in advance, the screen after the placement of the unplaced icon 262.

Figure 9:
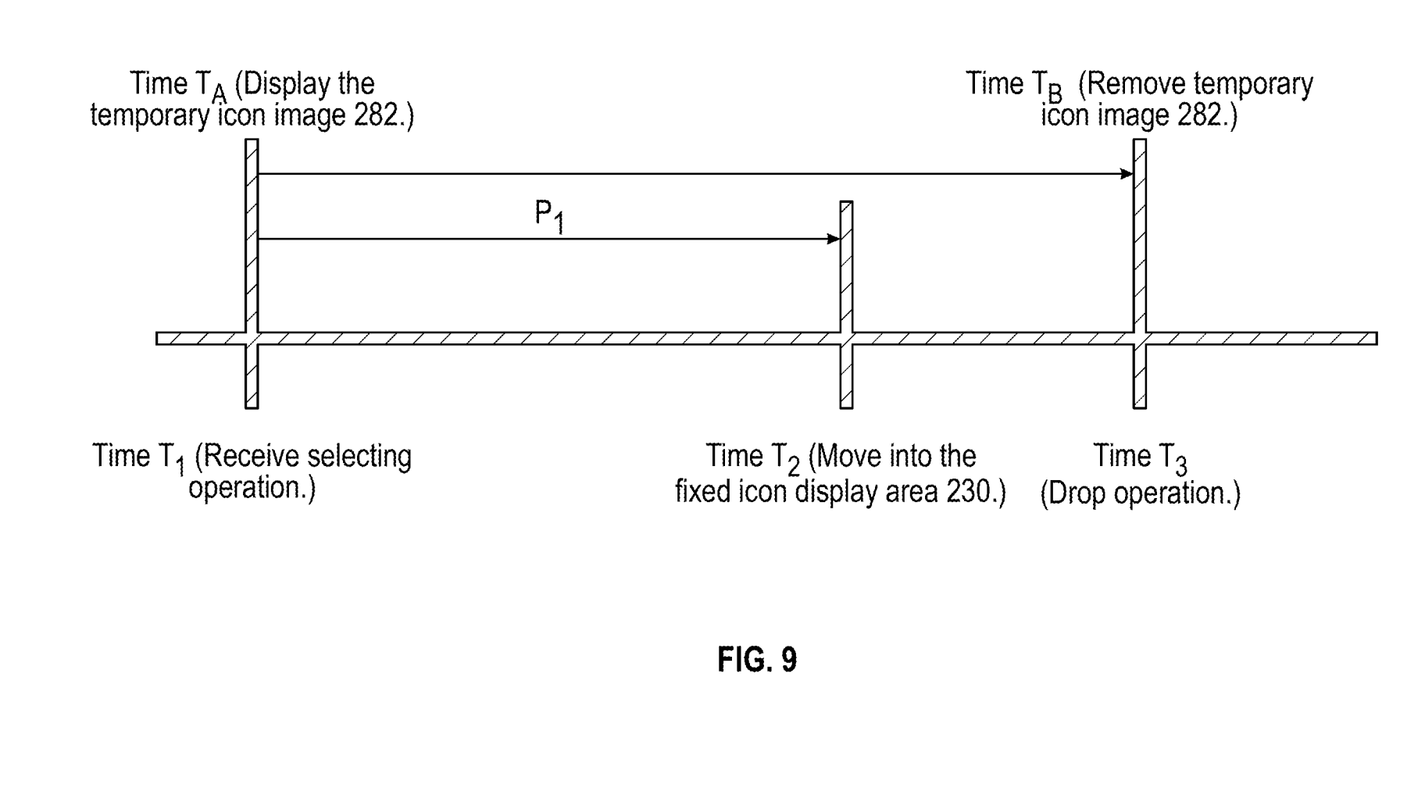
FIG. 9 is a diagram for explaining the display interval of a temporary icon image.

FIG. 9 is a diagram for explaining the display interval of a temporary icon image 282. In FIG. 9, time $T_1$ indicates the time at which the icon display controlling program 102 received the selecting operation for the unplaced icon 262. Time $T_2$ indicates the time at which the unplaced icon 262 was moved into the fixed icon display area 230 through a drag operation, or the like. Time $T_3$ indicates the time at which the moving operation for the unplaced icon 262 is completed through a drop operation, or the like. Time $T_A$ indicates the time at which the display of the temporary icon image 282 begins. That is, when time $T_A$ elapses, the temporary icon image 282 will be displayed at a predetermined placement position for the unplaced icon 262 within the fixed icon display area 230. Time $T_B$ indicates the time at which the display of the temporary icon image 282 is removed. Time $T_B$ is the same time as time $T_3$. Note that time $T_B$ (and time $T_3$) is a time prior to time $T_2$.

In the present embodiment, the display of the temporary icon image 282 begins at time $T_1$, when the selecting operation for the unplaced icon 262 is received. Because of this, the user is able to visualize the screen after placement of the unplaced icon 262 in the fixed icon display area 230 through viewing the fixed icon display area 230 immediately after selection of the unplaced icon 262.

Note that the time $T_A$ that is the start of the display of the temporary icon image 282 (the first time) is not limited to being the time $T_1$ at which the selecting operation is received. For example, the time $T_A$ may be any other type included in the period P1 (the first interval) from time $T_1$ until immediately prior to time $T_2$.

In this way, the icon display controlling program 102 operates as an image displaying unit 100f for displaying the temporary icon image 282, which shows the unplaced icon 262 at a predetermined placement position for the unplaced icon 262 that is determined in advance in the fixed icon display area 230, when time $T_A$ (the first time) that is included in the period P1 (the first interval) from the reception of the selecting operation for the unplaced icon 262 (the first icon) is received by the operation receiving unit 100b up until immediately prior to the unplaced icon 262 being moved, through a moving operation thereof, into the fixed icon display area 230 (into the display area) has elapsed.

Additionally, the icon display controlling program 102 that operates as the image displaying unit 100f displays the temporary icon image 282 at the predetermined position until the moving operation for the unplaced icon 262 (the first icon) has been completed by the operation receiving unit 100b.

The above is an explanation of an exemplary embodiment of the present disclosure. Embodiments of the present disclosure are not limited to that which was explained above, and a variety of modifications are possible within the scope of the technical concept and idea of the present disclosure. For example, details of arbitrary combinations of embodiments that are explicitly illustrated in the Specification, and embodiments that are obvious, and the like, are included in embodiments of the present application.

Although in the embodiment set forth above, a touch operation on an icon 222 that was placed in the icon display area 220 was used as an example of a selecting operation for an unplaced icon 262, a touch operation on a bookmark button 210a of the window 210 may be included as an example of a selecting operation for the unplaced icon 262.

When the bookmark button 210a of the window 210 is touched, the temporary icon image 282 that shows the unplaced icon 262 that corresponds to the content that is displayed in the window 210 is displayed at a designated position or predetermined position within the fixed icon display area 230. This enables the user to visualize easily the screen after placement of the unplaced icon 262 in the fixed icon display area 230.

When, after the touch operation on the bookmark button 210a, there is an operation such as heavily pressing on the bookmark button 210a, the temporary icon image 282 is removed, and the unplaced icon 262 is placed at the position at which the temporary icon image 282 had been displayed.

In this case as well, the user is able to use a simple operation to place the unplaced icon 262 in the fixed icon display area 230 after visualizing, in advance, the screen after the placement of the unplaced icon 262.

Figure 10:
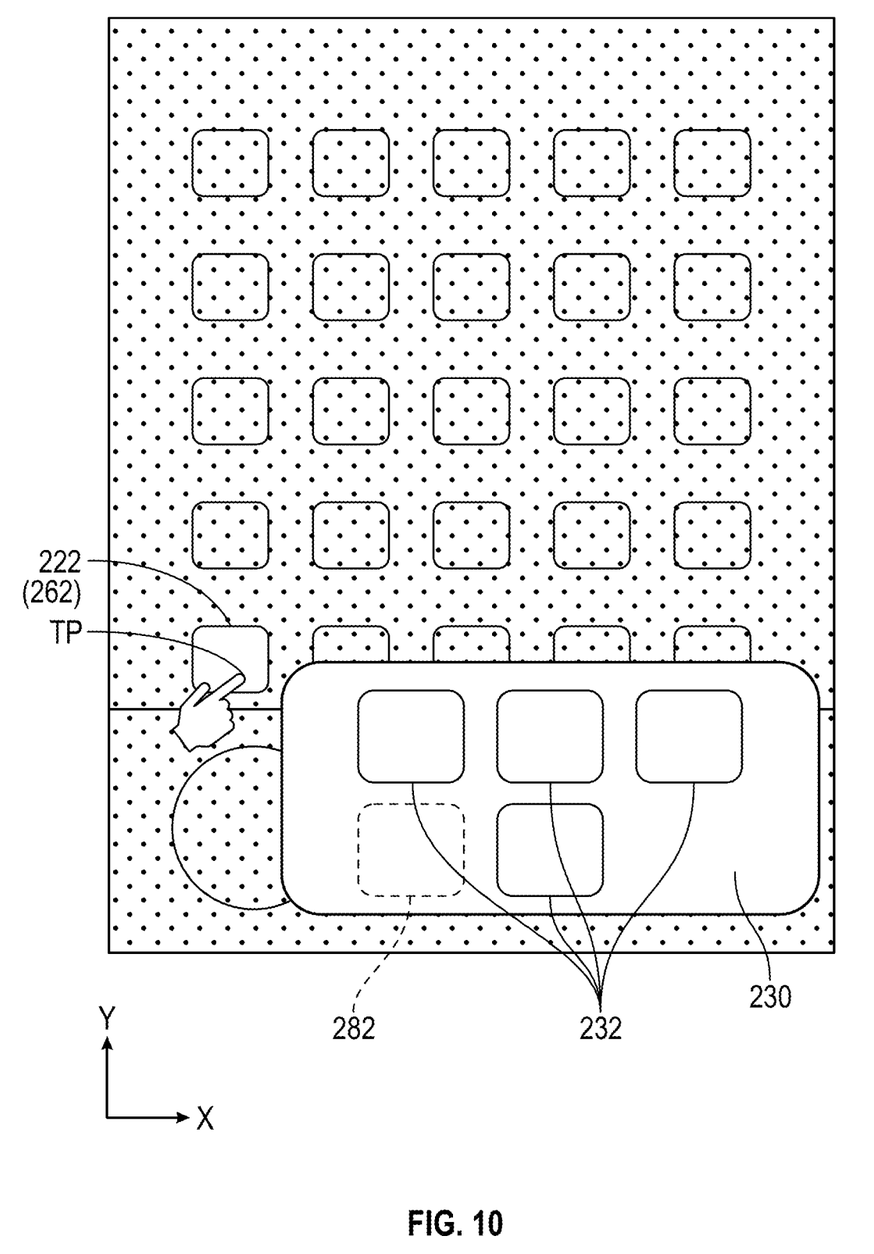
FIG. 10 shows an example of an icon that is displayed on the screen of the icon display controlling device according to a modified example.

FIG. 10 shows an example of an image that is displayed on the screen 138 of the icon display controlling device 1 according to a modified example. As shown in FIG. 10, when in the icon moving mode (that is, during the second interval from the operation receiving unit 100b receiving the selecting operation for the unplaced icon 262 until the detection of the completion of the moving operation), the icon display controlling program 102 according to the modified example displays, with a brightness that is less than that of the unplaced icon 262 and the fixed icon display area 230, the area of the screen 138 that is other than the unplaced icon 262 and the fixed icon display area 230.

Because in the screen 138 the unplaced icon 262 and the fixed icon display area 230 are displayed brightly, the user is able to recognize the unplaced icon 262 and the fixed icon display area 230 easily.

Additionally, as shown in FIG. 10, when in the icon moving mode the icon display controlling program 102 of the modified example displays the fixed icon display area 230 enlarged compared to before switching into the icon moving mode.

Enlarging the display of the fixed icon display area 230 causes the display sizes of the icon 232 and the temporary icon image 282 to be larger, and also widens the spacing between the icons 232 and the spacing between the icons 232 and the temporary icon image 282. This makes it easier for the user to move the unplaced icon 262 to the intended position in the fixed icon display area 230 when in the icon moving mode.

The icon display controlling program 102 may switch into an editing mode when there is a long push on an arbitrary position of the screen 138 while awaiting a selecting operation in Step S102. When in the editing mode, the user can select an icon 232 in the fixed icon display area 230 and, through a drag operation, or the like, move the selected icon 232 to another position in the fixed icon display area 230. When in the editing mode, the temporary icon image 282 is displayed at the position at which the user appears to be moving.

For example, when the user selects an icon 232 that has been placed at the first position in the fixed icon display area 230 and starts to drag it toward the positive side in the X direction, the temporary icon image 282 will be displayed at the position that is adjacent to the first position on the positive side in the X direction. Depending on the position at which the temporary icon image 282 is displayed in the fixed icon display area 230, the other icons 232 will be shifted in the direction away from the first position or toward the first position. The icon 232 that has been dragged will be placed at the position at which it is dropped. The arrangement of the icons 232 in the fixed icon display area 230 will be modified thereby. When in the editing mode, the user can easily visualize the arrangement after the arrangement change, through viewing the fixed icon display area 230 in which the temporary icon image 282 is displayed.

EXPLANATION OF REFERENCE NUMERALS

1: Icon Display Controlling Device
100: Controlling Unit
100A: CPU
100B: RAM
100C: ROM
100D: Input/Output Port
100a: Area Displaying Unit
100b: Operation Receiving Unit
100c: Position Determination Unit
100d: Thumbnail Displaying Unit
100e: Icon Placing Unit
100f: Image Displaying Unit
102: Icon Display Controlling Program
110: Communication Interface Unit
120: Operating Unit
130: Displaying Unit
132: Touch Panel Display
134: Display Driver
136: Pressure Sensor
140: Sound Outputting Unit
142: Speaker
144: Speaker Driver
150: Vibrating Unit
152: Vibrator
154: Vibrator Driver

What is claimed is:

1. An icon display controlling device, comprising:
an area displaying unit that causes a display to display a display area within which a first icon can be placed;
an operation receiving unit configured to receive a selecting operation for the first icon and a moving operation for moving, into the display area, the first icon by dragging the first icon that was selected by the selecting operation;
a determining unit configured to determine if there is a space in the display area where the first icon can be placed when selected by the selecting operation;
a predetermined placement position determining unit configured to determine a predetermined placement position for the first icon, the predetermined placement position being one of (a) the space in the display area, in response to determining, by the determining unit, that there is space in the display area that the first icon can be placed in, or (b) a designated position designated by a user for deleting an icon when it is determined, by the determining unit, that there is no space in the display area for the first icon to be placed; and an image displaying unit that causes the display to display an image that shows the first icon at the predetermined placement position determined by the predetermined placement position determining unit during the moving operation, at a time within a first interval that extends from reception of the selecting operation by the operation receiving unit until immediately prior to movement of the first icon into the display area due to the moving operation.

2. The icon display controlling device according to claim 1, wherein:

the image displaying unit causes the display to display the image at the predetermined placement position until the completion of the moving operation is detected by the operation receiving unit.

3. The icon display controlling device according to claim 1, further comprising:

an icon placing unit that places the first icon at the predetermined placement position when the completion of the moving operation is detected by the operation receiving unit.

4. The icon display controlling device according to claim 1, further comprising:

an information storing unit for storing information related to the display size and shape of the first icon, wherein:

the image displaying unit displays the image at the same display size and shape as the display size and shape that is stored in the information storing unit.

5. The icon display controlling device according to claim 1, wherein:

displaying an area other than the first icon and the display area on the screen at a first brightness lower than a second brightness of the first icon and the display area during a second interval from the reception of the selecting operation by the operation receiving unit to the detection of the completion of the moving operation.

6. The icon display controlling device according to claim 1, wherein:

the display area is displayed enlarged during a second interval from the reception of the selecting operation by the operation receiving unit until detection of the completion of the moving operation.

7. A non-transitory computer-readable medium including instructions stored thereon that, when executed by at least one processor, cause the at least one processor to perform operations comprising:

an area displaying step for displaying a display area within which a first icon can be placed;

an operation receiving step for receiving a selecting operation for the first icon and a moving operation for moving, into the display area, the first icon by dragging the first icon that was selected by the selecting operation;

a determination step for determining if there is a space in the display area where the first icon can be placed when selected by the selecting operation;

a predetermined placement position determination step for determining a predetermined placement position for the first icon, the predetermined placement position being one of (a) the space in the display area, in response to determining, by the determining unit, that there is space in the display area that the first icon can be placed in, or (b) a designated position designated by a user for deleting an icon when it is determined, by the determining unit, that there is no space in the display area for the first icon to be placed; and an image displaying step for displaying an image that shows the first icon at the predetermined placement position determined in the predetermined placement position determination step during the moving operation, at a time within a first interval that extends from reception of the selecting operation until immediately prior to movement of the first icon into the display area due to the moving operation.

* * * * *